United States Patent

Wahlstrom

[15] 3,699,537

[45] Oct. 17, 1972

[54] SINGLE-RAIL MOSFET MEMORY WITH CAPACITIVE STORAGE

[72] Inventor: Sven E. Wahlstrom, Palo Alto, Calif.

[73] Assignee: Shell Oil Company, New York, N.Y.

[22] Filed: Sept. 8, 1970

[21] Appl. No.: 70,353

Related U.S. Application Data

[63] Continuation-in-part of Ser. No. 825,257, May 16, 1969, Pat. No. 3,533,089.

[52] U.S. Cl. ..............................340/173 R, 377/238

[51] Int. Cl. ..........................................G11c 11/40

[58] Field of Search .....340/173 R, 173 FF; 307/238, 307/279

[56] References Cited

UNITED STATES PATENTS 3,581,292 5/1971 Polkinghorn...........340/173 R 3,435,138 3/1969 Borkan.................340/173 FF

*Primary Examiner*—Stanley M. Urynowicz, Jr.

*Attorney*—Harold L. Denkler and Theodore E. Bieber

[57] ABSTRACT

In connection with a one-device-per-bit capacitive MOSFET memory array, various topologies are disclosed for developing optimum memory storage capacitances between isolated P-regions and the fixed-potential substrate or a fixed-potential line. In particular, a fixed-potential line can be dispensed with, while retaining the improved capacitance associated therewith, by arranging the cells in pairs and cross-coupling them to one another. Particular clocking sequences and switching arrangements apposite to the cell topologies involved are also disclosed.

2 Claims, 12 Drawing Figures

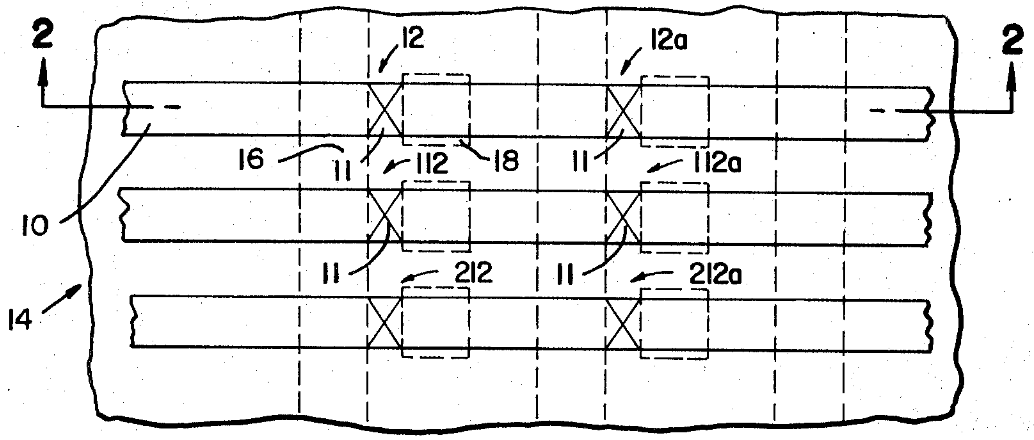
FIG_1
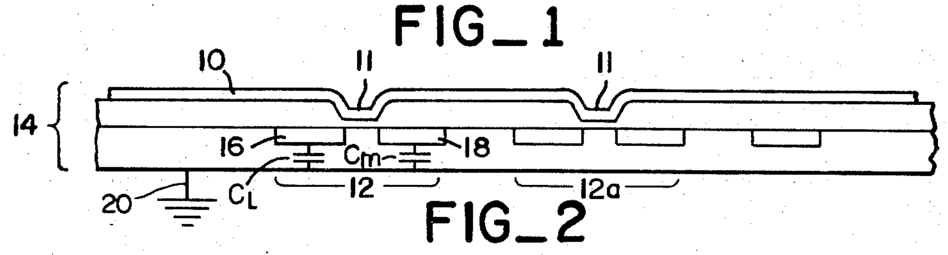
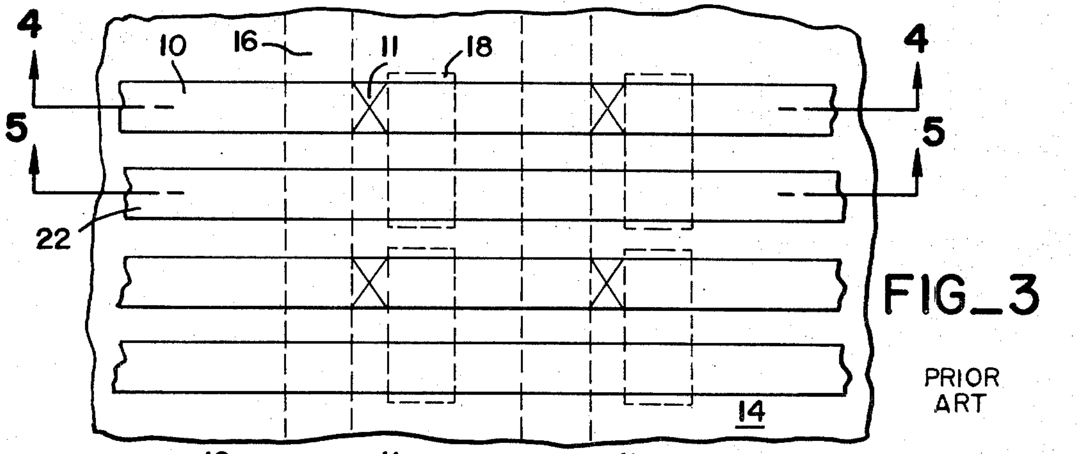
PRIOR ART
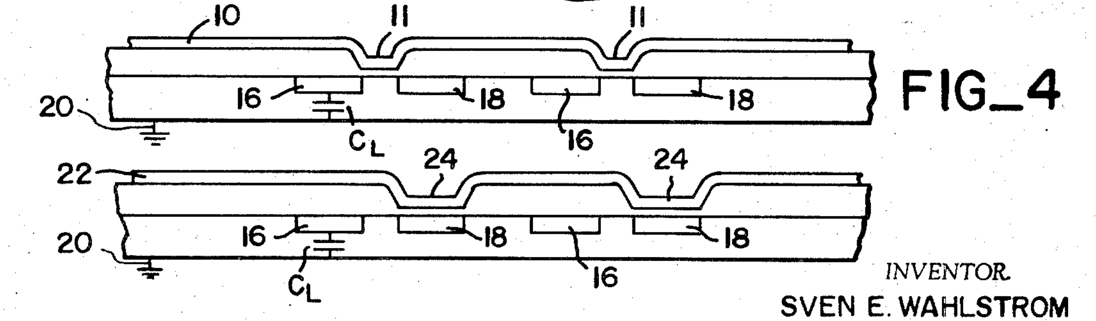
FIG_4, FIG_5
INVENTOR
SVEN E. WAHLSTROM
BY
Harold L. Denkler
ATTORNEY INVENTOR.
SVEN E. WAHLSTROM
BY
Harold L. Dinkler
ATTORNEY INVENTOR.
SVEN E. WAHLSTROM
BY
Harold L. Denkler
ATTORNEY INVENTOR
SVEN E. WAHLSTROM
BY
Harold L. Dinkler
ATTORNEY INVENTOR.
SVEN E. WAHLSTROM
BY
Harold L. Denkler
ATTORNEY INVENTOR
SVEN E. WAHLSTROM
BY
Harold L. Hinkler
ATTORNEY

SINGLE-RAIL MOSFET MEMORY WITH CAPACITIVE STORAGE

CROSS REFERENCE TO RELATED APPLICATION

This application is a continuation-in-part of application Ser. No. 825,257, filed May 16, 1969, now U.S. Pat. No. 3,533,089 and entitled "Single Rail MOSFET Memory with Capacitive Storage."

BACKGROUND OF THE INVENTION desirable

U. S. Pat. No. 3,387,286 discloses a one-MOSFET (Metal Oxide Silicon Field Effect Transistor) capacitive memory cell in which the memory capacitance is developed between an isolated P-region and a fixed-potential metallic overlay separated from the isolated P-region by a dielectric oxide layer. This construction requires a separate fixed-potential line (usually a ground line) connected to each cell, which involves certain manufacturing problems and expense. It is consequently desirable to eliminate the need for such a fixed-potential line.

In addition, it is desirable, for purposes of improving switching speed, to reduce the bit line capacitance to a minimum by the judicious use of read amplifiers and clocking sequences.

SUMMARY OF THE INVENTION

In accordance with the invention, a selected Y address enables each bit MOSFET with that Y address and thereby connects the storage capacitor for that bit to the bit line corresponding thereto. In the preferred embodiment of a word-oriented array, the X address enables all the bit lines with that X address by connecting them to the common read amplifiers, of which there are as many as there are bits per word. During a read pulse (i.e. a first-phase clock pulse) any charge stored in the capacitor of the selected bit is transferred into the bit line capacitance. This charge transfer produces a small voltage in the bit line which the read amplifier connected thereto senses as an information signal voltage. The output of the read amplifier is then fed to a flip-flop which stores the read indication and writes it back onto the bit storage capacitance through the same line, and by essentially the same process in reverse, when the restoring gate is enabled by an appropriate second-phase clock pulse. The restoring signal can be overridden by a write signal when it is desired to write new information. A third-phase clock is provided to discharge the bit lines between restoration and reading so as to pre-set the bit lines to receive information. The third-phase clock also resets the flip-flop.

Cell topologies which avoid the need for the fixed-potential line of the prior-art can take two forms: in a first form, the memory capacitance is developed between the isolated P-region which constitutes the source of the bit MOSFET and the fixed-potential substrate connection. In the second form, the capacitance is developed between the isolated P-region and a metallic overlay, but the overlay, instead of being a fixed-potential line, is connected to the address line of an adjacent cell.

The first form is suitable for use in conjunction with sensitive read amplifiers and chip topologies which reduce to a minimum the bit line capacitance driven by the memory capacitances. The second form preserves the high capacitance of the fixed-potential overlay method but does not require any fixed-potential line.

It is the object of the invention to provide maximum memory capacitance values while holding chip complexity to a minimum.

It is another object of the invention to provide means of maximizing the memory capacitance without the use of a fixed-potential line.

It is a further object of this invention to provide a chip construction in which the storage capacitances for the above said purposes can be conveniently formed THE DRAWINGS of the bit MOSFETS themselves.

It is yet another object of the invention to provide a chip topology which reduces the bit line capacitance to a minimum.

BRIEF DESCRIPTION OF THE DRAWINGS

FIGS. 1 and 2 are plan and sectional views, respectively, of a portion of a memory chip constructed in accordance with the invention showing one preferred memory storage capacitance arrangement;

FIGS. 3, 4 and 5 are views similar to FIGS. 1 and 2 but showing the prior art method of forming the storage capacitances;

DESCRIPTION OF THE PREFERRED EMBODIMENT

Figure 6:
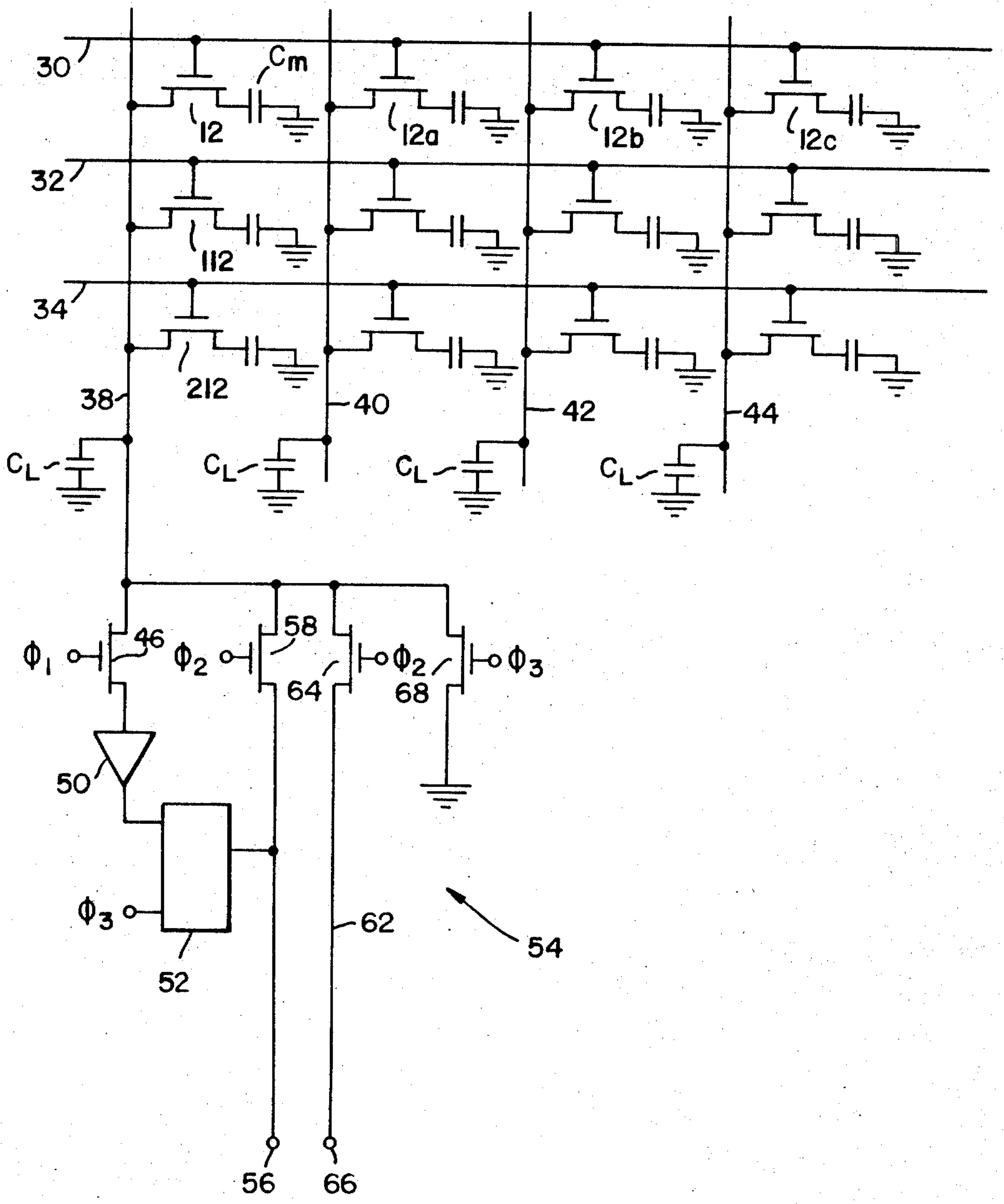
FIG. 6 is a diagrammatic representation showing the basic operation of the memory of this invention.

The concept of information storage by impressing a charge on a capacitance through an active element, and then retrieving that charge through the active element at an appropriate time, is well known as such. This concept is very useful in the field of integrated circuit technology because it permits the construction of memory arrays from MOSFETS (metal oxide silicon field effect transistors), of which hundreds and even thousands can be placed on a single silicon chip together with their associated circuitry.

Microminiaturized integrated circuits of the siliconchip type, however, have some pecularities MOSFETs make the application of the capacitive storage concept quite difficult. Specifically, the microscopic size of the components involved makes it imperative that the capacitances be formed on MOSFETs chip MOSFETs MOSFET. as part of, or at least in immediate proximity to, the MOSFETS with which they are associated. The capacitance of capacitors which can be produced in such a location and in the size compatible with the size of the MOSFETS themselves is, however, quite small; and as a practical matter, the inherent capacitance of the leads or lines which connect individual bit MOSFETS together is far greater than the capacitance of the individual capacitors which can be formed in conjunction with each MOSFET.

Fortunately, it is not necessary that the capacitance of the storage capacitors be even nearly comparable to the capacitance of the line capacitances. If the reading and writing operations can be accomplished by the transfer of incremental charges from the storage capacitors to the line capacitances and back, then the line will show a slight change in potential which can be recognized by a readout amplifier.

Taking advantage of this fact, the present invention in one of its aspects provides for forming, as part of the MOSFET itself, a capacitor of just sufficient capacitance so that the transfer of its charge into the line capacitance produces a detectable potential in the line. FIGS. 1 and 2 show preferred physical structures capable of carrying out this concept.

In the cross-sectional view of FIG. 1, 10 may represent, for example, a Y line such as the metallic conductor which constitutes the gate electrodes 11 of MOSFETS 12, 12*a* formed on silicon chip 14. The drain electrode of the MOSFET 12 consists of the P-region 16, which is common to MOSFETS 12, 112, and 212 and which forms the bit line common to these MOSFETS. The source electrode consists of a P-region 18 associated only with MOSFET 12. To form the storage capacitance $C_m$, the P-region 18 which constitutes the source electrode of MOSFET 12 is simply left unconnected. The capacitance $C_m$ then consists of the capacitance between the isolated P-region 18 and the grounded substrate connection 20.

It will be noted that the topology of FIGS. 1 and 2 dispenses with the need for the fixed-potential line of the prior art topology shown in FIGS. 3–5. In those figures, an additional ground line 22 is provided between each of the Y lines 10. The P-region 18 is then enlarged in a direction transverse to the Y line 10 and ground line 22. Where it overlies the P-region 18, the ground line 22 is brought close to the P-region 18 (with only an oxide layer of gate insulation thickness separating them), as best shown at 24 in FIG. 5. The oxide layer 26 constitutes the dielectric of the separate capacitor formed by P-region 18 and ground line 22.

The manner in which memory cells of either type can be used in an actual memory array is basically illustrated in FIG. 6. In that figure, 30, 32, 34 denote three Y address lines of an array which may have any desired number of Y address lines. Likewise, 38, 40, 42, 44 designate four bit address lines, which may correspond to the bits of a set of four-bit words having a common X address. Each bit-Y address in the array is associated with one specific MOSFET, such as MOSFET 12 associated with the address 30, 38.

The addressing of Y line 30 by an appropriate Y address pulse causes MOSFETS 12, 12*a* 12*b* and 12*c* to be gated. As will be noted from FIG. 9, the initiation of any address comes at a time when all bit lines have been reset to logic "0." Consequently, assuming that the bit of MOSFET 12 is in a "1" memory condition (e.g. with its $C_m$ charged to −5volts), and that the bits of MOSFETS 12*a*, 12*b*, and 12*c* are in a "0" condition (i.e. with no charge on their $C_m$s), a charge will be transferred from the $C_m$ of MOSFET 12 into the bit line capacitance $C_L$ of bit line 38. No charge will be transferred to the line capacitances $C_L$ of bit lines 40, 42, and 44.

Due to the relative values of capacitances of $C_m$ and $C_L$, the 5-volt charge of $C_m$ discharging through MOSFET 12 upon occurrence of the $Y_{30}$ address pulse produces a negative potential in the bit line 38. During the first-phase clock or read pulse $\phi_1$ (FIG. 9), which gates read gate 46, this potential is sensed by the read amplifier 50, and a "1" indication is transmitted to the storage element 52 by the read amplifier 50. It will be understood that each bit line has its own information processing circuitry 54, only one set of which is shown for clarity.

Figure 9:
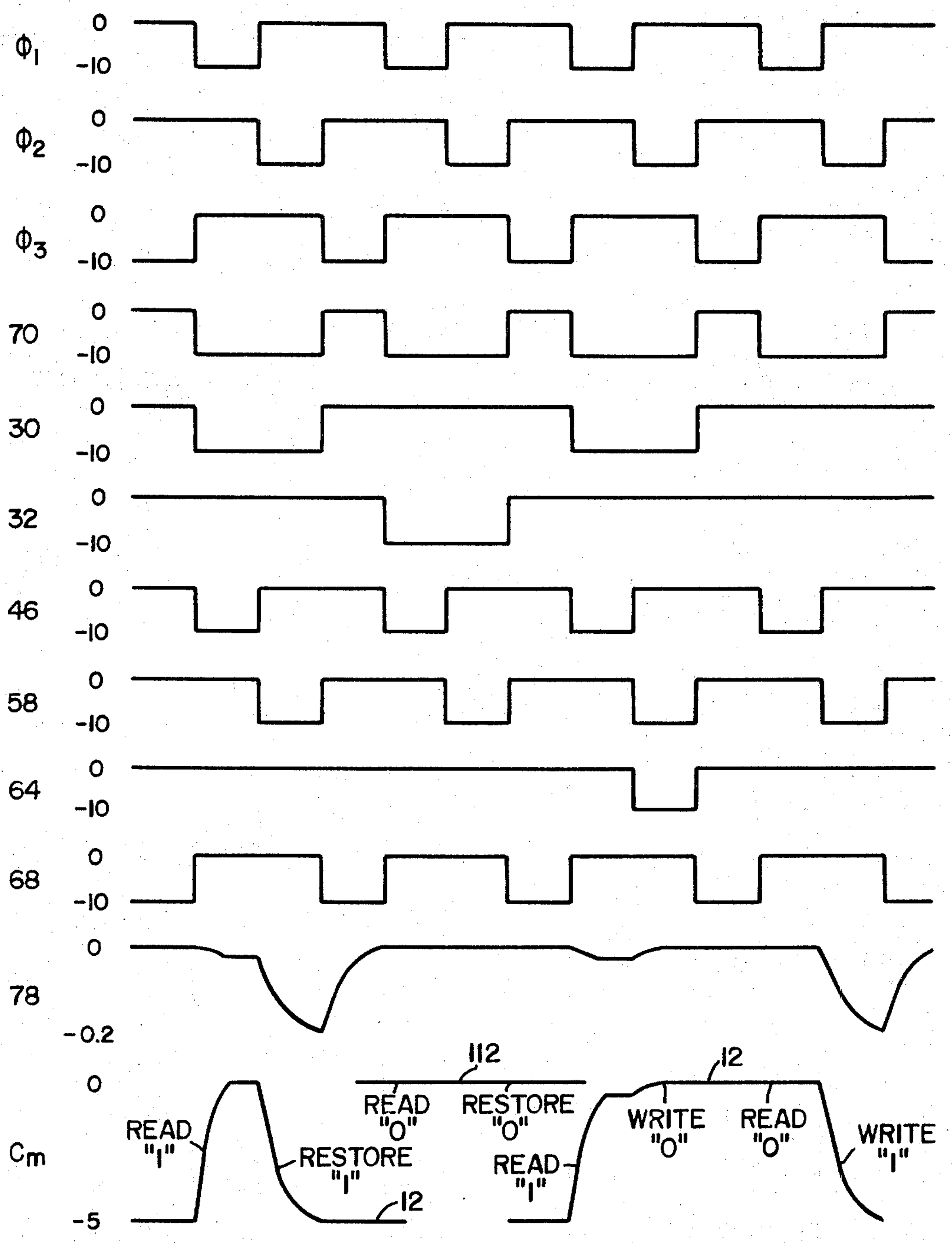
FIG. 9 is a graphical representation of the waveforms appearing at various points in the circuit of FIG. 7.

Inasmuch as the addressing of MOSFETS 12, 12*a*, 12*b* and 12*c* has destroyed the information therein, the information must now be restored. For this purpose, the "1" indication stored in flip-flop 52, which appears in the data output line 56, is applied to the bit line 38 through restore gate 58 during the second-phase clock or write pulse $\phi_2$ (FIG. 9). The magnitude of the restoring signal (if it is a "1") is sufficient to drive the bit line 38 to a potential at which the $C_m$ of MOSFET 12 becomes fully recharged. No potential was produced during the read pulse on bit lines 40, 42, 44 due to the "0" condition of bits 12*a*, 12 *b* and 12*c*. Hence, the flip-flops associated with these bit lines produce no output during the write pulse, and bit lines 40, 42 and 44 remain at ground level.

It if is desired to write into bit 12 instead of restoring it, the write gate 64 is enabled during the second phase $\phi_2$ connecting the bit line to an outside low impedance data source 66. The gate 58 is not enabled during $\phi_2$ when writing takes place. At the end of $\phi_2$, the bit line and the selected memory capacitor $C_m$ are charged to the potential of the data source.

It will be noted that $C_m$ cannot be charged without also charging $C_L$. Consequently, a third clock phase $\phi_3$ (FIG. 9) must be provided to discharge $C_L$ after all memory MOSFETS are blocked. This is done by using $\phi_3$ to gate the grounding gate 68. The operation of grounding gate 68 prior to each read pulse $\phi_1$ assures that all bit lines are at ground and are ready to receive informational charges from the addressed memory bits.

Like all physical capacitances, the capacitances $C_m$ are subject to leakage discharge and hence to gradual loss of information. Consequently, all bits of the memory must be periodically exercised to refresh the information stored therein, a matter which can be accomplished by appropriate programming.

Figure 7:
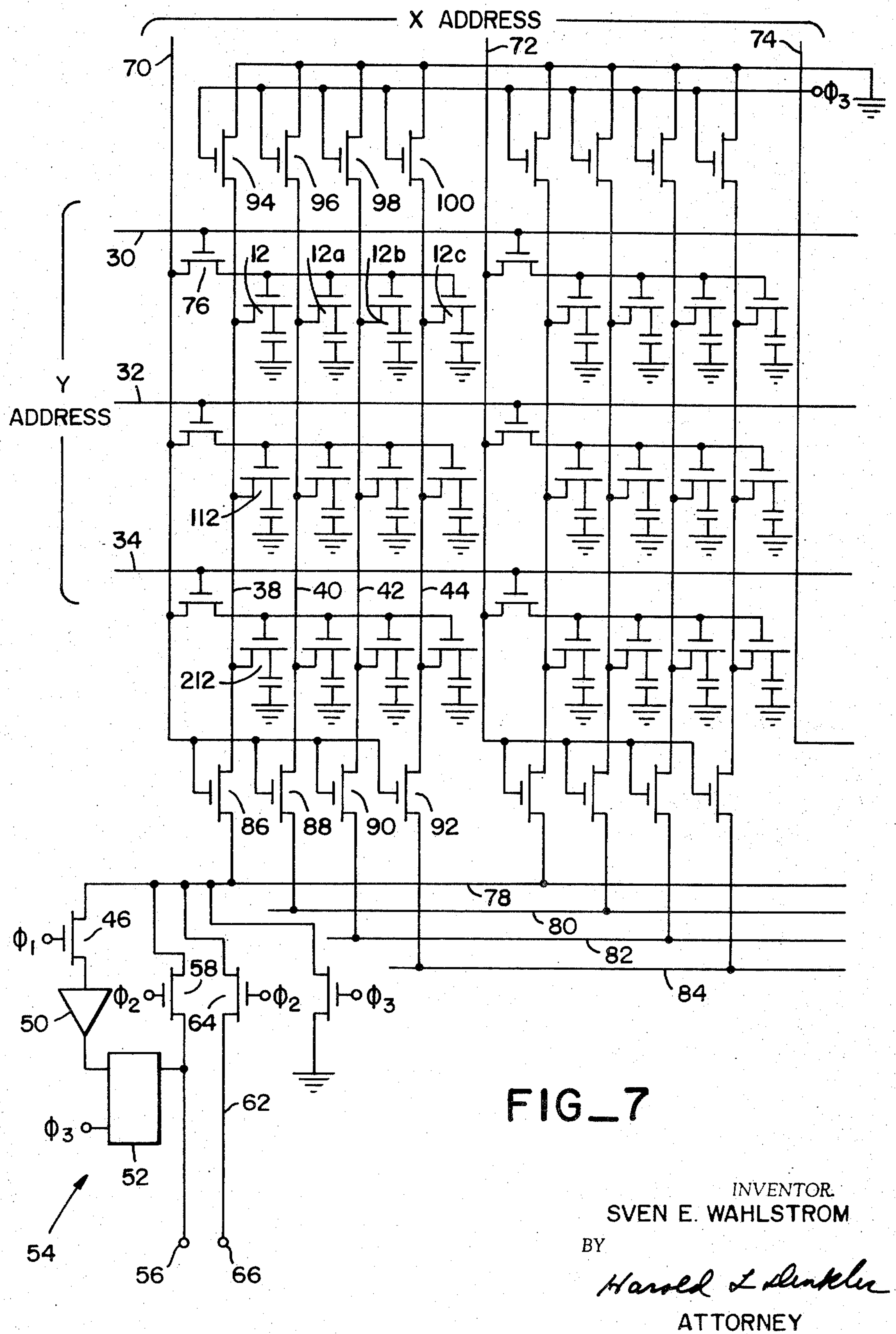
FIG. 7 is a circuit diagram showing an array constructed in accordance with this invention, together with its address and bit line pre-set gates.
Figure 8:
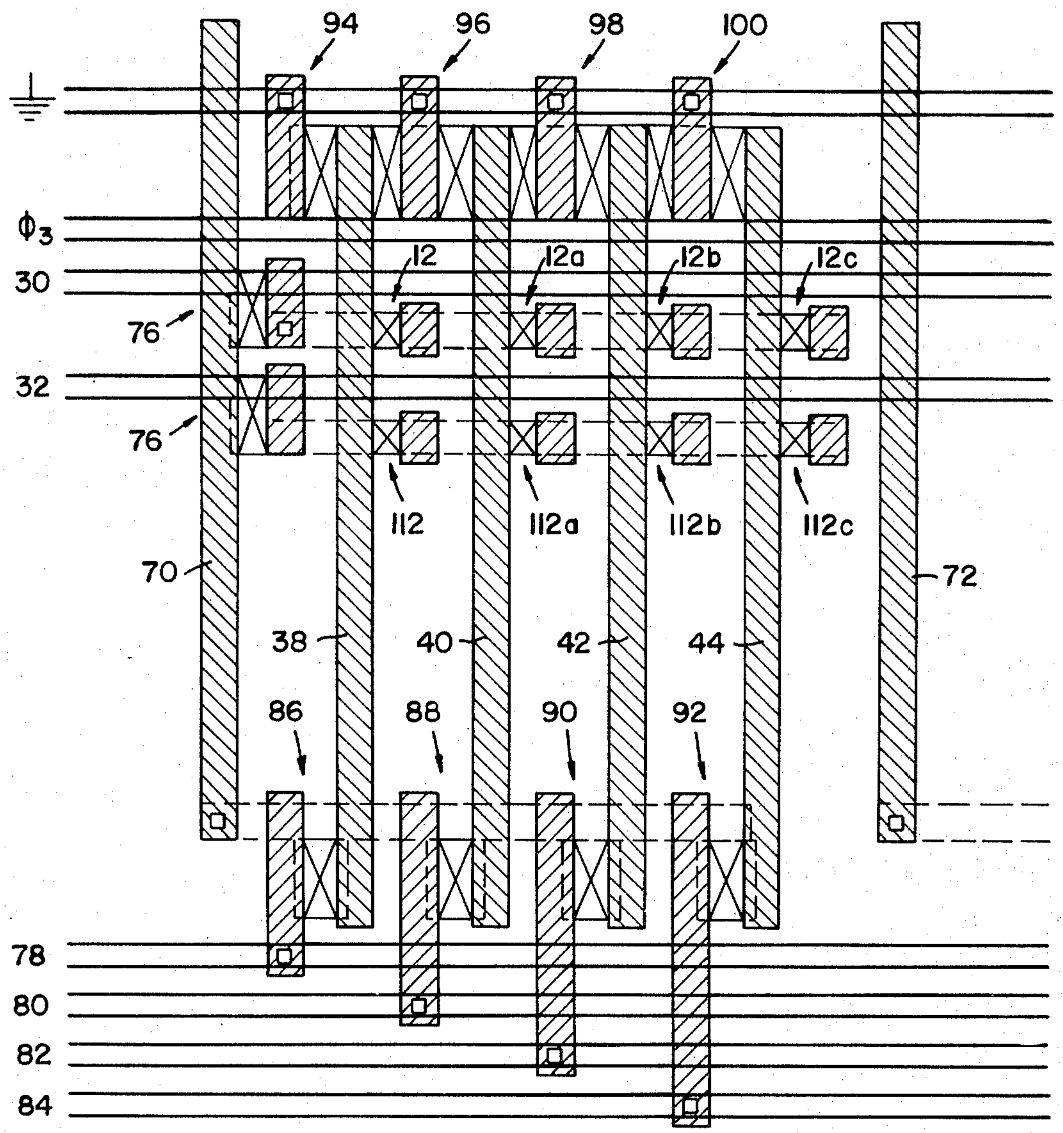
FIG. 8 illustrates a preferred topology of the circuit of FIG. 7.

FIGS. 7 and 8 show a typical work-oriented memory array embodying the concepts of this invention. The Y address topology, on Y lines 30, 32, 34 and the X address appears on X lines 70, 72, 74. The coincidence of a given pair of X and Y addresses operates the word selector gate 76 corresponding thereto. The selector gate 76 in turn enables the memory MOSFETS 12, 12*a*, 12*b*, 12*c* of the selected word in the manner discussed connection with FIG. 6 above. The information obtained from the addressed bits is transferred to bit lines 38, 40, 42, 44 which are connected to the common bit lines 78, 80, 82, 84 by the X-address-operated gates 86, 88, 90 and 92 respectively for a purpose hereinafter described.

The reading, writing, restoring and presetting circuitry of FIG. 7 is the same as that of FIG. 6. However, if the X address, like the Y address, is to be present only during the $\phi_1$ and $\phi_2$ clock times, additional presetting gates 94, 96, 98, 100 are required to discharge the individual bit lines 38, 40, 42, 44.

FIG. 8 shows a preferred topology for the circuit of FIG. 7. It will be noted that this topology, in providing for X-address gating between the individual bit lines 38, 40, 42, 44 and the common bit lines 78, 80, 82, 84, respectively, reduces the $C_L$ to be charged by each bit $C_m$ to the $C_L$ of one individual bit line plus the $C_L$ of one common bit line. This reduction of $C_L$ allows the use of the topology of FIGS. 1 and 2 for the individual bits, and dispenses with the necessity for the ground lines of FIGS. 3–5.

FIG. 9 shows the waveforms occuring at the indicated points in the circuit of FIG. 7 in their proper time relationship, and is illustrative of the charge transfer processes involved.

Figure 10:
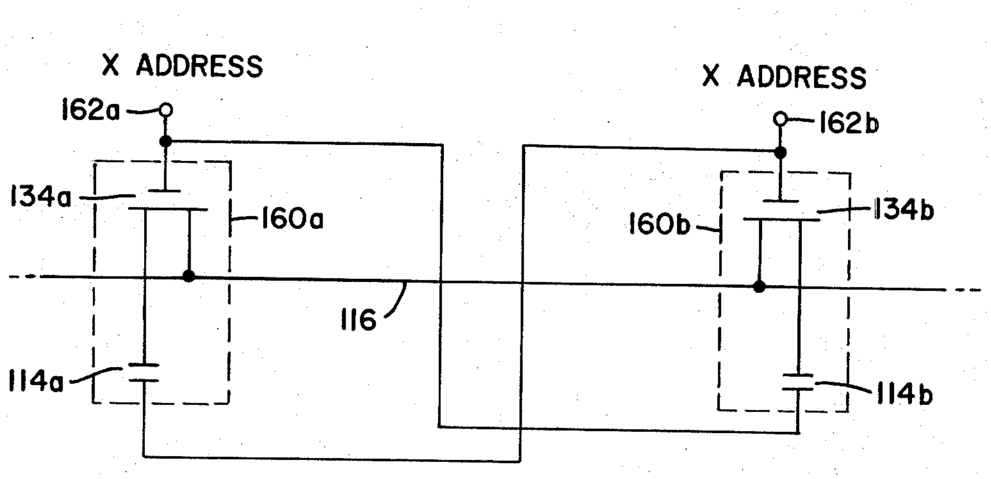
FIG. 10 is a circuit diagram of another preferred memory storage capacitance arrangement.

The circuit of FIG. 10 retains the advantage of increased memory capacitance provided by the ground bus or fixed-potential line and yet eliminates the ground bus itself. To illustrate this principle, FIG. 10 shows two memory cells designated as **160*a*** and 160*b*, which may correspond to a pair of adjacent memory cells 12, 112 of FIG. 6, both connected to the bit line 38. The memory cells **160*a* and 160*b* contain MOSFETS 134*a* and 134*b* and memory capacitances 114*a* and 114*b*, respectively. One side of the MOSFETS 134*a* and 134*b* is connected to the bit line diffusion 116 (which may correspond to bit line 38 of FIG. 6), whereas the other side of the source-drain circuit of MOSFETS 134*a*, 134*b* is connected to the capacitances 114*a* and 114*b*, respectively. The gate electrodes of MOSFETS 134*a* and 134*b* are connected, respectively, to two different address lines 162*a* and 162*b*, which may correspond to the Y address lines 30, 32 of FIG. 6. The bottom sides of capacitances 114*a* and 114*b* are connected, respectively, to the address lines 162*b* and 162*a***.

It will be seen that when cell **160*a* is addressed, the connection from the bottom side of capacitance 114*a* to the address line 162*b* acts as a ground bus for the capacitance 114*a*, as the address line 162*b* must of necessity be grounded when the address line 162*a* is energized. When the address line 162*b* is energized at some other time, the memory capacitance 114*a* is not affected, as MOSFET 134*a* is blocked at this time and no energy transfer can take place through capacitance 114*a* regardless of any variations in the potential of address line 162*b***.

Figure 11:
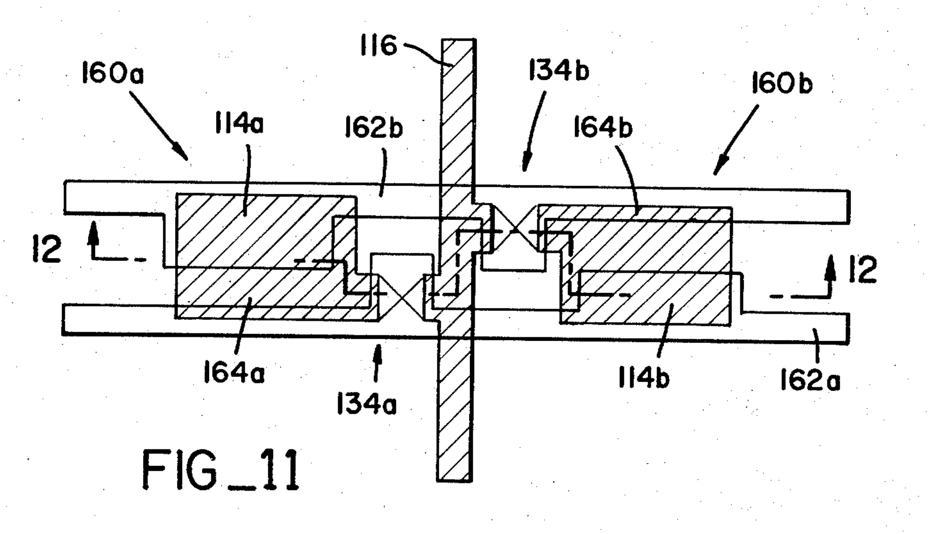
FIGS. 11 and 12 are plan and sectional views, respectively of a portion of a memory chip constructed in accordance with the arrangement of FIG. 10.

FIG. 11 illustrates the fact that the interconnection shown in FIG. 10 not only permits the large metal-over-diffusion capacitance which otherwise would be achieved only by the use of a separate ground or fixed potential bus, but that the cross-coupling of the memory cells in pairs achieves a substantial size reduction, with an attendant improvement in the operational speed of the circuit. It should be understood that although the most logical cross connection is made between two cells on the same bit line, the inventive concept of FIG. 10 is not restricted to this, and the same result can be achieved if MOSFET **134*a* is connected to bit line 38 and MOSFET 134*b* is connected to bit line 40. The only change such an arrangement would necessitate in the topology of FIGS. 11 and 12 is that the diffusion 116 would have to be split into two separate portions, one connected to MOSFET 134*a* and the other to MOSFET 134*b***.

Figure 12:
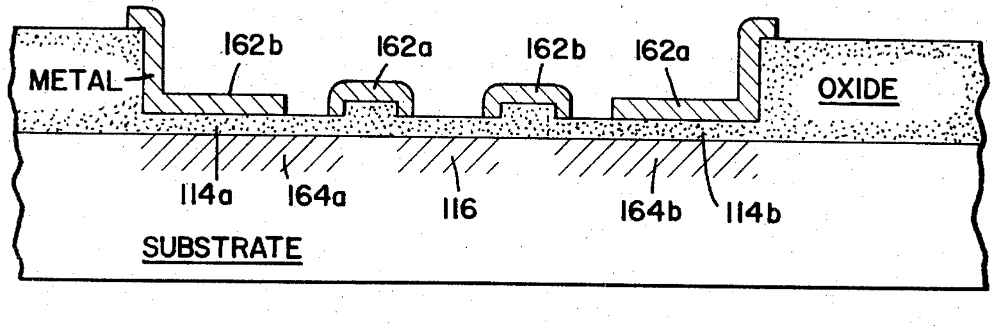

FIG. 12 is a cross section along line 12—12 of FIG. 11 and illustrates the manner in which the capacitances **114*a* and 114*b*** are formed on the chip.

I claim:

1. In a capacitive memory array having a plurality of memory cells each consisting of a field-effect transistor whose gate electrode is connected to an address line and whose source-drain circuit is connected in series between bit line means and one side of a memory capacitance, the improvement comprising:
   grouping said memory cells in pairs, the memory capacitance of each cell of each pair being connected to the address line of the other cell of the same pair.

2. The improvement of claim 1, in which the cells of each pair are physically adjacent and are connected to a common bit line means positioned between them.

* * * * *